United States Patent Office 3,051,673
Patented Aug. 28, 1962

3,051,673
COATING COMPOSITIONS
Fred John Stark, Princeton, Ill., assignor to Custom Polymers, Inc., Princeton, Ill., a corporation of Delaware
No Drawing. Filed Aug. 28, 1959, Ser. No. 836,627
18 Claims. (Cl. 260—28.5)

This invention, in general, relates to coating compositions containing, as one of the major ingredients, butyl rubber. More particularly, the compositions of this invention are ones utilizing for coating applications the advantageous properties of butyl rubber such as oxidation resistance, ozone resistance, aging resistance, heat resistance, resistance to attack by strong acids, etc., with minimal or substantially no disadvantageous qualities of butyl rubber per se in coating uses—including such disadvantageous qualities as tackiness, cold flow of the coating after application to inclined or vertical surfaces, and webbing and stringing in brush or roller application or in spraying.

Butyl rubber is an elastomeric, high-molecular weight addition copolymer of isobutylene and a minor amount of an aliphatic, 1,3-diene—such as butadiene, isoprene, piperylene or dimethyl butadiene. The most common butyl rubbers are addition copolymers of isobutylene and butadiene or isoprene, usually the latter. The diene compound does not exceed 7% by weight of the total weight of the isobutylene and the diene compound, and usually the diene compound constitutes about 1–3% by weight of these two polymerizable olefines. Butyl rubbers have such a pronounced natural tackiness that special packaging is required to prevent sticking of the solid polymer to paperboard container walls. See, for example, U.S. Patent Nos. 2,394,616 and 2,403,964.

The coating compositions of my invention are solutions of butyl rubber in a volatile, aliphatic hydrocarbon solvent having a distillation point range within the range of about 280–380° F., including such solvents as mineral spirits, Stoddard solvent, a light end point aliphatic hydrocarbon solvent such as LEP solvent (Central Solvents Corp.), or the like. More volatile aliphatic hydrocarbons, beginning with n-hexane and n-heptone, which boil at 156° F. and 209° F., respectively, may be used although they are less preferred than the solvents boiling at 280–380° F.

Also, dissolved in the hydrocarbon solvent is a hard, solid resin having an ASTM ball and ring softening point above 70° C. This resin is obtained by catalytically polymerizing an essentially hydrocarbon mixture in the presence of 0.5–2.5% metal halide catalyst, such as aluminum chloride or aluminum bromide, at 0–60° C., preferably 30–50° C. The essentially hydrocarbon mixture so polymerized is a stream from the deep cracking of petroleum stock, and 90% of said stream boils at atmospheric pressure below 125° C. It comprises at least 10% by weight conjugated diolefins and a total of at least 20% by weight of conjugated diolefins and readily polymerizable olefins and is essentially or approximately devoid of polymerizable aromatics. In preferred embodiments, the diolefin content of the polymerizable mixture is at least 15% by weight and the total of conjugated diolefins and readily polymerizable olefins is at least 30% by weight. These resins and the processes for preparation thereof are described in Canadian Patent No. 531,-202 of A. L. Ward, issued October 2, 1956, the disclosure of which is incorporated herein by reference as if it had been set forth in its entirety. They are used in amounts within the range of 4–150% by weight, based on the butyl rubber, preferably 80–150%.

The resin preferred is one having an average molecular weight of approximately 1100 although resins of molecular weights in the range of 900–1400 may be used. The resin of average molecular weight 1100 has a ball and ring softening point, approximately 100° C.±3° C., and is derived from monomers of average molecular weight of approximately 90.

Another important ingredient of my coating compositions is a hydrocarbon wax, which is either the wax ozokerite of natural origin or certain synthetically derived hydrocarbon waxes. The latter waxes are exceptionally hard, high melting point hydrocarbon waxes consisting essentially of saturated, essentially straight chain paraffin hydrocarbons. They have an average molecular weight of approximately 630–980, corresponding to approximately 45–70 carbon atoms per molecule as an average, with a melting point in the range of about 180–225° F. The acid, saponification and bromine numbers are approximately zero. Waxes having these characteristics are sold under the trade name "Paraflint."

The synthetic waxes are those derived by the familiar Fischer-Tropsch process, wherein hydrogen and carbon monoxide are reacted in the presence of known catalysts to produce hydrocarbons, with the synthetic wax fraction as one of the products. The wax fraction is then refined and purified.

Thus, the butyl rubber compositions of this invention are highly useful coating compounds because of the excellent properties of butyl rubber with respect to oxidation, weather, etc. Elimination of tackiness, cold flow, webbing and/or stringing characteristics inherent in butyl rubber per se enables the use of butyl rubber as the major ingredient in coating compositions where these characteristics of butyl rubber have heretofore been objectionable.

Ozokerite is an amorphous hydrocarbon occurring naturally in the earth and is found in, among other places, Poland, Austria, Russia, Utah and Texas. It occurs in Miocene formations and is usually found in domes of subterranean petroleum deposits. The crude wax is separated from earthy matter by melting the wax in boiling water and then drawing off the upper wax layer. The crude wax is purified by treatment with sulfuric acid and bleaching to obtain lighter colored products.

Ozokerite is usually sold in three commercial grades. The unbleached grade is black in color, the single bleached grade yellow in color, and the double bleached grade white in color. The latter two grades are usually employed in compositions of the instant invention.

The following are the general physical and chemical properties of ozokerite:

| | |
|---|---|
| Melting point | 149–210° F. |
| Specific gravity | 0.85–0.95. |
| Acid No | 0. |
| Saponification No | 0. |
| Iodine No | 7.8–9.2. |
| Sulfur | 0.2%. |
| Ash | 0.16%. |
| Color | White, Yellow, Green, Black. |
| Refractive index (60° C.) | 1.440. |
| Penetration at 77° F. (100 g., 5 sec.) | 14. |

The chemical constitution of ozokerite is not definitely known. Indications are, however, that it is a mixture of solid saturated and unsaturated hydrocarbons of high molecular weight and contains some liquid hydrocarbons and oxygenated bodies. It is soluble in benzene, benzol, turpentine, kerosene, toluol, xylol, mineral spirits, carbon disulfide, isopropyl ether, trichlorethylene, and is insoluble in ethyl and methyl alcohols. The solubility of ozokerite in the aforementioned compositions, however, is relatively low, the maximum solubility being about 13 parts by weight in 100 grams of carbon disulfide. It is less soluble in the other solvents. I have found that ozokerite alone does not form stable solutions with common solvents used heretofore, particularly at relatively high concentrations—the ozokerite tending to seed out or precipitate upon standing for several days or weeks.

In the coating compositions of my invention, either ozokerite or the synthetic wax above described may be employed, or the two waxes may be used in admixture in any proportions. Stated another way, the ozokerite may be 0–100% and the synthetic wax 100–0% of the total weight of the two waxes in my coating compositions. The total amount of the ozokerite and said synthetic wax in my coating compositions is, based on the weight of the butyl rubber, in the range of about 10–80% by weight and optimally 20–80% by weight—the amount referring to the ozokerite, the synthetic wax, or the mixture or blend of ozokerite and synthetic wax, as the case may be.

My coating compositions further contain, in accordance with the best practice of my invention, a vulcanizer capable of vulcanization of the butyl rubber at 50–175° F. The vulcanizer preferably is one which will vulcanize the butyl rubber in the ultimate coating without application of external heat to the coating after it has been applied. An example of an excellent vulcanizer for my coating compositons is N-methyl-N,4-dinitrosoaniline, which is incorporated in the coating compositions in an amount of about 0.1–2% by weight, based on the butyl rubber.

Further examples of butyl rubber vulcanizers or curing agents which may be used in my coating compositions are dimethylol phenols in conjunction with an inorganic metal halide accelerator. The dimethylol phenol employed as curing agents are known materials. The dimethylol phenol employed may be essentially a monomeric material, or it may be a polymeric material formed by self-condensation of the dimethylol phenol to yield a heat-reactive, oil-soluble resinous product. Such resinous polymeric dimethylol phenols are the preferred materials for use in manufacturing the coating compositions from butyl rubber in accordance with this invention. Mixtures of the resinous polymeric dimethylol phenols with lower molecular weight or monomeric dimethylol phenols are also useful. For convenience, the term "dimethylol phenol" will be used to refer to any of the monomeric or polymeric compounds, or to mixtures thereof, unless otherwise stated.

As will be understood by those skilled in the art, the dimethylol phenols are typically made by reacting a para-substituted phenol having the two ortho positions unoccupied, with a considerable molar excess of formaldehyde, the molar ratio of formaldehyde to phenol typically being 2:1, in the presence of a strong alkaline catalyst, especially an alkali metal hydroxide, which is subsequently neutralized. Typically the mixture of the phenol, formaldehyde and alkaline catalyst is heated at a suitable temperature, e.g., 25–100° C., the first stage of the reaction involving formation of the phenol methylol, i.e., the para-substituted-2,6-dimethylol phenol. This material, which is a phenol dialcohol, can be isolated by acidification of the mixture and separation of the oily layer which can then be advanced to higher molecular weight form by heating at say 75–175° C. This higher molecular weight form is oil-soluble and heat-reactive, and has the advantages that it is more reactive with the butyl rubber than the lower molecular weight form. Separation of the phenol dialcohol can be omitted, in which case the reaction is carried past the monomer stage to the resinous stage, whereupon the mixture is neutralized and water is removed to give the resinous material. In any case, care should be taken to stop while the resin is in the soluble (in conventional organic solvents and drying oils) and fusible state. This is the resol type of resin.

The phenol from which the dimethylol phenol is made generally has a hydrocarbon group in the position para to the phenolic hydroxyl, examples being alkyl groups, especially alkyl groups having from 3 to 20 carbon atoms such as tertiary-butyl and tertiary-octyl (alpha, alpha, gamma, gamma-tetramethyl butyl), cycloalkyl groups, aryl groups such as phenyl, and aralkyl groups such as benzyl and cumyl.

More particularly, these phenol dialcohols can be made from a para-alkyl-phenol and formaldehyde in the presence of alkali, as shown by Honel in U.S. Patent 1,996,069, or Charlton et al., in U.S. 2,364,192, and others, and by modifications which are well known. The para-substituted phenol dialcohols belong in the class of materials known as resols, and they are reactive because of their terminal methylol groups. They are distinguished from the novolacs, which are made in acid medium with less formaldehyde, and which contain no terminal methylol groups and are therefore not reactive. Although the para-substituted phenol dialcohols are reactive, they are not to be confused with the ordinary thermosetting phenol-formaldehyde condensate. The latter contains three available reactive positions (the two ortho positions and the para position) and forms insoluble, infusible three-dimensional cross-linked products. The para-substituted phenol dialcohols, in contrast, contain only two reactive positions (the third being "blocked" by the para substituent) and can therefore undergo only linear condensation.

The Carswell volume entitled "Phenoplasts," published by Interscience Publishers, New York, 1950, on pp. 17–22, discusses the formation of the monocyclic and multicyclic phenol dialcohols from para-substituted phenols and aldehydes.

Examples of monocyclic phenol dialcohols include 2,6-dimethylol-4-methyl phenol; 2,6-dimethylol-4-tert. butyl phenol; 2,6-dimethylol-4-octyl phenol; 2,6-dimethylol-4-phenyl phenol; 2,6-dimethylol-4-benzyl phenol; 2,6-dimethylol-4-(alpha, alpha-dimethylbenzyl) phenol; 2,6-dimethylol-4-dodecyl phenol; and 2,6- dimethylol-4-dodecyl phenol; and 2,6-dimethylol-4-cyclohexyl phenol. In the foregoing materials the para substituent is an alkyl, cycloalkyl, aryl or aralkyl radical.

Multicyclic phenol dialcohols are the polymeric dialcohols containing in each molecule more than one phenolic residue which can be formed as shown in Carswell by heating the corresponding monocyclic dialcohol. They are properly termed "condensation polymers" of the monomeric (i.e. monocyclic) phenol dialcohols, or, less accurately, they are frequently termed merely "polymers" of the simple phenol dialcohols.

For convenience, the term "phenol dialcohol" will be used to refer to any of the above defined monocyclic or multicyclic compounds, or to mixtures thereof, unless otherwise stated.

The multicyclic phenol dialcohols used in the invention usually are mixtures of the compounds shown in Carswell to be formed by heating monocyclic phenol dialcohol. While the individual multicyclic phenol dialcohols can be used in the invention, they are not usually easy to make in a pure state. It is preferred to use the mixture of compounds because they act as effectively as the individual compounds and are much cheaper.

The vulcanization accelerator is a heavy metal halide, preferably the chloride or bromide of tin, iron or zinc. The heavy metal halide accelerators are such stable acidic halides as stannous chloride, zinc chloride, ferric chloride, and in general the halides of various metals usually classified as heavy metals. Other exemplary heavy metal halides in this class include aluminum chloride, chromium chloride, nickel chloride, cobalt chloride, manganese chloride, copper chloride, aluminum bromide, and stannic iodide. The most preferred are the chlorides of tin, iron and zinc. The heavy metal halides are effective independently of the state of oxidation of the metal, and they may be even effective if the halide is partially hydrolyzed, or is only a partial halide, as in zinc oxychloride.

The dimethylol phenol is employed in amounts within the range of about 20–150 parts by weight per 100 parts of butyl rubber. While smaller amounts of the dimethylol phenol may be employed, it is usually found that less than this amount is insufficient to produce a practical cure within a reasonable time. However, if only a limited or partial reaction between the dimethylol phenol and the butyl rubber is all that is required, then very small amounts, e.g., as low as 5 parts per 100 parts of butyl rubber, may suffice. Also, larger amounts may be used, for example 200 parts per 100 parts of butyl rubber, but amounts greater than this are without further advantage.

The amount of heavy metal halide employed in the invention is not critical and may vary considerably, provided that it is employed in amounts sufficient to effect the acceleration. Usually only a very small amount is used, since the heavy metal halides are extremely potent in their accelerating action. Thus, definite accelerating effect may be noted with as little as one part of the heavy metal halide per 100 parts of butyl rubber, although generally the amount of heavy metal halide will be in the order of 3–15 parts per 100 parts of butyl rubber. Although in some cases even larger amounts of the accelerator can be used, say 20 parts, it is not generally necessary or desirable to use appreciably more than 15 parts. In most cases, 5–10 parts of heavy metal halide per 100 parts of butyl rubber will suffice to give optimum results. The dimethylol phenol-heavy metal halide vulcanizer can be used advantageously in conjunction with a small amount, e.g., 0.1–2%, based on the butyl rubber, of the N-methyl-N,4-dinitrosoaniline vulcanizer. When dimethylol phenol vulcanizers and heavy metal halide accelerators are employed, the ozokerite and/or synthetic wax content may be as low as 4%, based on the butyl rubber.

Other compounds optimally included in coating compositions are an anti-fungicide, an example of which is zinc naphthenate used in the proportion of 5–15% by weight, based on the butyl rubber, and a small amount of a polyalkyl-substituted phenol wherein the alkyl groups have 1–6, preferably 1–4, carbons. These compounds serve as dispersing aids and improve the dispersion and homogeneity of the solids in my coating compositions. Examples thereof are 2,6-di-tertiary butyl-4-methyl phenol, 2,6-di-tertiary butyl-4-isopropyl phenol, 2,6-di-tertiary hexyl-4-methyl phenol, 2,6-di-ethyl-4-tertiary butyl phenol, and the like. It is preferred that at least one alkyl group, optimally two, is a tertiary alkyl of 4–6 carbons. They are used in quantities of 0.4–1.2% by weight, based on the butyl rubber.

The compounds hreretofore listed for use with butyl rubber in my coating compositions have been observed as providing the following qualities to the coating compositions and/or the ultimately formed coatings. The desirable, and also the disadvantageous, qualities of butyl rubber in coating uses have been heretofore discussed. The waxes, the ozokerite and/or the synthetic hydrocarbon waxes, reduce and substantially eliminate the aftertack found in butyl rubber per se. They further contribute substantially toward eliminating cold flow of the applied coating—cold flow being the creeping or very slow flow of the butyl rubber coating after it dries. Furthermore, these waxes completely or substantially eliminate webbing and/or stringing normally encountered with butyl rubber solutions and thereby render the butyl rubber coating compositions of my invention readily applicable to many types of surfaces by brushing, by coating roller application, or by spraying. Webbing or stringing is the formation of webs or strings between the brush, roller, or spray nozzle as it is applied to the surface to be coated and said surface.

The petroleum resin gives better adhesion qualities to the coating compositions, and it also assists in preventing stratification or separation of the major components in the solution forming the coating composition. The vulcanizers' function is primarily to vulcanize or cure the butyl rubber sufficiently to eliminate, in conjunction with the waxes, the cold flow in the ultimate coating.

To obtain proper blending and to form a stable solution of all the ingredients in the organic solvent, the solutions are prepared in the following order of addition. The butyl rubber is cut into small pieces which are then dissolved by agitation thereof in an aliphatic hydrocarbon solvent of the type heretofore described until the butyl rubber is dissolved. Then the previously described hydrocarbon resin in small pieces is added, and agitation is continued until the resin has dissolved in the solvent. Thereafter is dissolved the wax(es) with agitation, followed by the addition of in the following order the polyalkyl phenol, the N-methyl-N,4-dinitrosoaniline, and the fungicide, e.g., zinc naphthenate. Where a dimethylol phenol vulcanizer and the heavy metal halide accelerator are included, the former is dissolved or blended before addition of the hydrocarbon resin and the latter is added as the last ingredient.

The concentration of the butyl rubber in the solutions forming the coating compositions of this disclosure will be based on the weight of the entire solution, in the range of 6–50%. The other ingredients will correspond to the weight ratios relative to butyl rubber heretofore defined. The wax(es), hydrocarbon resin, and/or any of the other ingredients may be added dry as described above, or may be predissolved or partly dissolved in a small portion of the solvent. Thereafter, the solution is blended into the main batch at the stage of the formulation process indicated above.

The following examples describe specific embodiments of compositions encompassed by my invention. The parts are by weight unless otherwise indicated.

*Example 1*

A coating composition is formulated by first dissolving at ambient temperature and under mild agitation 1200 lbs. in small pieces, e.g., 1″ x 1″ x ¼″, of butyl rubber (Enjay Butyl 150, an isobutylene-isoprene copolymer having a mol percent unsaturation in the range of 1.0–1.5%) in 1200 gallons of an aliphatic hydrocarbon solvent essentially devoid of aromatic hydrocarbons (LEP solvent, Central Solvents Corp., a liquid, light end point, aliphatic hydrocarbon solvent having a distillation range of about 310–350° F. and Sp. G. of about 0.777±0.002).

This solution is then agitated with 1400 lbs. of a flaked resin of the type heretofore described, which resin is derived by polymerization in the presence of a metal halide catalyst of a hydrocarbon mixture containing conjugated diolefins and olefins and derived from the deep cracking of petroleum. This particular resin is reported to have an ASTM ball and ring softening point of 100° C.±3° C., is reported to be derived from monomers having an average molecular weight of about 90, and is reported to have an average molecular weight of 1050–1100. It is marketed by the Pennsylvania Industrial Chemical Company under the trade name Piccopale 100.

When the resin has been dissolved, 639 lbs. of single bleached ozokerite are added and dissolved in the solution with agitation. Then, in the following order, the following are dissolved in the solution under agitation: 2,6-di-tertiary butyl-4-methyl phenol, 9.12 lbs.; N-methyl-N,4-dinitrosoaniline; 2.2 lbs.; and zinc naphthenate, 99 lbs.

The resulting solution is a stable solution without stratification of butyl rubber or ozokerite upon standing. Its final volume is approximately 1609 gals. at a weight of about 6.8 lbs./gal.

*Example 2*

Following the technique of Example 1, a coating composition is formulated from the following amounts and ingredients in the order given:

| | |
|---|---|
| Butyl rubber (Enjay Butyl 268, an isobutylene-isoprene copolymer having a mol percent unsaturation of about 3%) _____lbs__ | 1200 |
| Mineral spirits_____gals__ | 1350 |
| Piccopale 100_____lbs__ | 1100 |
| Paraflint _____lbs__ | 710 |
| 2,6-di-tertiary butyl-4-methyl phenol_____lbs__ | 8.5 |
| N-methyl-N,4-dinitrosoaniline _____lbs__ | 1.8 |
| Zinc naphthenate_____lbs__ | 100 |

*Example 3*

In accordance with the general procedure of Example 1, another coating composition was prepared from the following amounts and compounds in the order stated:

| | Lbs. |
|---|---|
| Butyl rubber (Enjay Butyl 215, an isobutylene-isoprene copolymer having a mol percent unsaturation of 1.5–1.9%) _____ | 96 |
| LEP solvent_____ | 96 |
| p-Tertiary butyl dimethylol phenol_____ | 24 |
| Piccopale 100_____ | 6 |
| Ozokerite _____ | 6 |
| N-methyl-N,4-dinitrosoaniline _____ | 0.75 |
| Stannous chloride_____ | 2.25 |

This solution should be applied by roller applicator.

*Example 4*

In accordance with the procedure of Example 1, a butyl rubber coating composition is formulated in the following amounts of ingredients in the order given:

| | |
|---|---|
| Butyl rubber (Enjay Butyl 268, supra)_____lbs__ | 1000 |
| LEP solvent_____gals__ | 900 |
| Single bleached ozokerite_____lbs__ | 450 |
| Paraflint _____lbs__ | 150 |
| N-methyl-N,4-dinitrosoaniline _____lbs__ | 2 |
| 2,6-diethyl-4-tertiary butyl phenol_____lbs__ | 10 |
| Zinc naphthenate_____lbs__ | 85 |

*Example 5*

In accordance with the procedure of Example 1, a coating composition is formulated in the following amounts of ingredients in the order given:

| | |
|---|---|
| Butyl rubber (Enjay Butyl 268, supra)_____lbs__ | 1200 |
| LEP solvent_____gals__ | 1200 |
| 2,6-dimethylol-4-dodecyl phenol_____lbs__ | 250 |
| Piccopale 100_____lbs__ | 1200 |
| Single bleached ozokerite_____lbs__ | 200 |
| Paraflint _____lbs__ | 450 |
| N-methyl-N,4-dinitrosoaniline _____lbs__ | 12 |
| ZnCl$_2$ in 36 lbs. water_____lbs__ | 36 |

*Example 6*

In accordance with the technique of Example 1, a coating composition is prepared by formulating the following amounts of ingredients in the order given:

| | |
|---|---|
| Butyl rubber (Enjay Butyl 150, supra)_____lbs__ | 1000 |
| Mineral spirits_____gals__ | 1100 |
| Amberol ST-137 (a mixture of multicyclic phenol dialcohols made by polycondensation of two mols of formaldehyde per mol of p-octyl-phenol in presence of NaOH)_____lbs__ | 250 |
| Piccopale 100_____lbs__ | 400 |
| Ozokerite _____lbs__ | 200 |
| N-methyl-N,4-dinitrosoaniline _____lbs__ | 15 |
| FeCl$_3$ in 200 lbs. water_____lbs__ | 200 |

In the foregoing description, "butyl rubber" is a trade name for a synthetic rubber comprising an interpolymer of isobutylene and a small amount, relative to the isobutylene, of a conjugated (1,3) diene hydrocarbon having 4–6 carbons, including butadiene, isoprene, piperylene and dimethyl butadiene. Isoprene is the most commonly employed diene. The diene content of commercial butyl rubbers ordinarily is in the range of 1–7% of the total interpolymerized isobutylene and diene and in most cases is in the range of 1–3%.

The invention is claimed as follows:

1. A coating composition comprising a solution in an aliphatic hydrocarbon solvent of an interpolymer of isobutylene and a small amount up to 7% by weight, based on the isobutylene, of an aliphatic 1,3-diene hydrocarbon of 4–6 carbons, a wax selected from the group consisting of ozokerite, a synthetic hydrocarbon wax obtained by the Fischer-Tropsch process, said synthetic wax having an average molecular weight in the range of 630–980 with a melting point in the range of about 180–225° F., and mixtures of said waxes, the waxes amounting to 4–80 weight percent of said interpolymer, and 4–150 weight percent, based on said interpolymer, of a solid hydrocarbon resin derived by the metal halide polymerization of a hydrocarbon mixture obtained from the deep cracking of petroleum, 90% of which mixture boils at atmospheric pressure below 125° C., and which mixture comprises at least 10% by weight of conjugated diolefins and a total of at least 20% by weight of conjugated diolefins and readily polymerizable olefins and being approximately devoid of polymerizable aromatics.

2. A coating composition comprising a solution in an aliphatic hydrocarbon solvent having a distillation point range within the range of 280–380° F. of an interpolymer of isobutylene and a small amount up to 7% by weight, based on the isobutylene, of an aliphatic 1,3-diene hydrocarbon of 4–6 carbons, a wax selected from the group consisting of ozokerite, a synthetic hydrocarbon wax obtained by the Fischer-Tropsch process, said synthetic wax having an average molecular weight in the range of 630–980 with a melting point in the range of about 180–225° F., and mixtures of said waxes, the waxes amounting to 10–80 weight percent of said interpolymer, and 80–150 weight percent, based on said interpolymer, of a solid hydrocarbon resin derived by the metal halide polymerization of a hydrocarbon mixture obtained from the deep cracking of petroleum, 90% of which mixture boils at atmospheric pressure below 125° C., and which mixture comprises at least 10% by weight of conjugated diolefins and a total of at least 20% by weight of conjugated diolefins and readily polymerizable olefins and being approximately devoid of polymerizable aromatics.

3. A coating composition comprising a solution in an aliphatic hydrocarbon solvent of an interpolymer of isobutylene and a small amount up to 7% by weight, based on the isobutylene, of an aliphatic 1,3-diene hydrocarbon of 4–6 carbons, 10–80 weight percent, based on said interpolymer, of the wax ozokerite, and 80–150 weight percent, based on said interpolymer, of a solid hydrocarbon resin derived by the metal halide polymerization of a hydrocarbon mixture obtained from the deep cracking of petroleum, 90% of which mixture boils at atmospheric pressure below 125° C., and which mixture comprises at least 10% by weight of conjugated diolefins and a total of at least 20% by weight of conjugated diolefins and readily polymerizable olefins and being approximately devoid of polymerizable aromatics.

4. A coating composition comprising a solution in an aliphatic hydrocarbon solvent of an interpolymer of isobutylene and a small amount up to 7% by weight, based on the isobutylene, of an aliphatic 1,3-diene hydrocarbon of 4–6 carbons, 10–80 weight percent, based on said interpolymer, of a synthetic hydrocarbon wax obtained by the Fischer-Tropsch process, said synthetic wax having an average molecular weight in the range of 630–980 with a melting point in the range of about 180–225° F., and 80–150 weight percent, based on said interpolymer, of a solid hydrocarbon resin derived by the metal halide polymerization of a hydrocarbon mixture obtained from the deep cracking of petroleum, 90% of which mixture boils at atmospheric pressure below 125° C., and which mixture comprises at least 10% by weight of conjugated diolefins and a total of at least 20% by weight of conjugated diolefins and readily polymerizable olefins and being approximately devoid of polymerizable aromatics.

5. A coating composition comprising a solution in an aliphatic hydrocarbon solvent of an interpolymer of isobutylene and a small amount up to 7% by weight, based on the isobutylene, of an aliphatic 1,3-diene hydrocarbon of 4–6 carbons, a wax selected from the group consisting of ozokerite, a synthetic hydrocarbon wax obtained by the Fischer-Tropsch process, said synthetic wax having an average molecular weight in the range of 630–980 with a melting point in the range of about 180–225° F., and mixtures of said waxes, the waxes amounting to 10–80 weight percent of said interpolymer, 80–150 weight percent, based on said interpolymer, of a solid hydrocarbon resin derived by the metal halide polymerization of a hydrocarbon mixture obtained from the deep cracking of petroleum, 90% of which mixture boils at atmospheric pressure below 125° C., and which mixture comprises at least 10% by weight of conjugated diolefins and a total of at least 20% by weight of conjugated diolefins and readily polymerizable olefins and being approximately devoid of polymerizable aromatics, and a vulcanizer for said interpolymer.

6. A coating composition comprising a solution in an aliphatic hydrocarbon solvent of an interpolymer of isobutylene and a small amount up to 7% by weight, based on the isobutylene, of an aliphatic 1,3-diene hydrocarbon of 4–6 carbons, 10–80 weight percent, based on said interpolymer, of the wax ozokerite, 80–150 weight percent, based on said interpolymer, of a solid hydrocarbon resin derived by the metal halide polymerization of a hydrocarbon mixture obtained from the deep cracking of petroleum, 90% of which mixture boils at atmospheric pressure below 125° C., and which mixture comprises at least 10% by weight of conjugated diolefins and a total of at least 20% by weight of conjugated diolefins and readily polymerizable olefins and being approximately devoid of polymerizable aromatics, and 0.1–2 weight percent, based on said interpolymer, of N-methyl-N,4-dinitrosoaniline.

7. A coating composition comprising a solution in an aliphatic hydrocarbon solvent of an interpolymer of isobutylene and a small amount up to 7% by weight, based on the isobutylene, of an aliphatic 1,3-diene hydrocarbon of 4–6 carbons, 10–80 weight percent, based on said interpolymer, of a synthetic hydrocarbon wax obtained by the Fischer-Tropsch process, said synthetic wax having an average molecular weight in the range of 630–980 with a melting point in the range of about 180–225° F., 80–150 weight percent, based on said interpolymer, of a solid hydrocarbon resin derived by the metal halide polymerization of a hydrocarbon mixture obtained from the deep cracking of petroleum, 90% of which mixture boils at atmospheric pressure below 125° C., and which mixture comprises at least 10% by weight of conjugated diolefins and a total of at least 20% by weight of conjugated diolefins and readily polymerizable olefins and being approximately devoid of polymerizable aromatics, and 0.1–2 weight percent, based on said interpolymer, of N-methyl-N,4-dinitrosoaniline.

8. A coating composition comprising a solution in an aliphatic hydrocarbon solvent of an interpolymer of isobutylene and 1–7% isoprene, based on the total weight of interpolymerized isobutylene and isoprene, 10–80 weight percent, based on said interpolymer, of the wax ozokerite, and 80–150 weight percent, based on said interpolymer, of a solid hydrocarbon resin derived by the metal halide polymerization of a hydrocarbon mixture obtained from the deep cracking of petroleum, 90% of which mixture boils at atmospheric pressure below 125° C., and which mixture comprises at least 10% by weight of conjugated diolefins and a total of at least 20% by weight of conjugated diolefins and readily polymerizable olefins and being approximately devoid of polymerizable aromatics.

9. A coating composition comprising a solution in an aliphatic hydrocarbon solvent of an interpolymer of isobutylene and 1–7% isoprene, based on the total weight of interpolymerized isobutylene and isoprene, 10–80 weight percent, based on said interpolymer, of a synthetic hydrocarbon wax obtained by the Fischer-Tropsch process, said synthetic wax having an average molecular weight in the range of 630–980 with a melting point in the range of about 180–225° F., and 80–150 weight percent, based on said interpolymer, of a solid hydrocarbon resin derived by the metal halide polymerization of a hydrocarbon mixture obtained from the deep cracking of petroleum, 90% of which mixture boils at atmospheric pressure below 125° C., and which mixture comprises at least 10% by weight of conjugated diolefins and a total of at least 20% by weight of conjugated diolefins and readily polymerizable olefins and being approximately devoid of polymerizable aromatics.

10. A coating composition comprising a solution in an aliphatic hydrocarbon solvent of an interpolymer of isobutylene and a small amount up to 7% by weight, based on the isobutylene, of an aliphatic 1,3-diene hydrocarbon of 4–6 carbons, 10–80 weight percent, based on said interpolymer, of the wax ozokerite, 80–150 weight percent, based on said interpolymer, of a solid hydrocarbon resin derived by the metal halide polymerization of a hydrocarbon mixture obtained from the deep cracking of petroleum, 90% of which mixture boils at atmospheric pressure below 125° C., and which mixture comprises at least 10% by weight of conjugated diolefins and a total of at least 20% by weight of conjugated diolefins and readily polymerizable olefins and being approximately devoid of polymerizable aromatics, and 0.4–1.2 weight percent, based on said interpolymer, of a polyalkyl-substituted phenol wherein the alkyl groups have 1–6 carbons and 1–2 of the alkyl groups is a tertiary alkyl group of 4–6 carbons.

11. A coating composition comprising a solution in an aliphatic hydrocarbon solvent of an interpolymer of isobutylene and a small amount up to 7% by weight, based on the isobutylene, of an aliphatic 1,3-diene hydrocarbon of 4–6 carbons, 10–80 weight percent, based on said interpolymer, of a synthetic hydrocarbon wax obtained by the Fischer-Tropsch process, said synthetic wax having an average molecular weight in the range of 630–980 with a melting point in the range of about 180–225° F., 80–150 weight percent, based on said interpolymer, of a solid hydrocarbon resin derived by the metal halide polymerization of a hydrocarbon mixture obtained from the deep cracking of petroleum, 90% of which mixture boils at atmospheric pressure below 125° C., and which mixture comprises at least 10% by weight of conjugated diolefins and a total of at least 20% by weight of conjugated diolefins and readily polymerizable olefins and being approximately devoid of polymerizable aromatics, and 0.4–1.2 weight percent, based on said interpolymer, of a polyalkyl-substituted phenol wherein the alkyl groups have 1–6 carbons and 1–2 of the alkyl groups is a tertiary alkyl group of 4–6 carbons.

12. A coating composition comprising a solution in an aliphatic hydrocarbon solvent of an interpolymer of isobutylene and a small amount up to 7% by weight, based on the isobutylene, of an aliphatic 1,3-diene hydrocarbon of 4–6 carbons, 10–80 weight percent, based on said interpolymer, of the wax ozokerite, 80–150 weight percent, based on said interpolymer, of a solid hydrocarbon resin derived by the metal halide polymerization of a hydrocarbon mixture obtained from the deep cracking of petroleum, 90% of which mixture boils at atmospheric pressure below 125° C., and which mixture comprises at least 10% by weight of conjugated diolefins and a total of at least 20% by weight of conjugated diolefins and readily polymerizable olefins and being approximately devoid of polymerizable aromatics, and 0.4–1.2 weight percent, based on said interpolymer, of 2,6-di-tertiary butyl-4-methyl phenol.

13. A coating composition comprising a solution in an aliphatic hydrocarbon solvent of an interpolymer of isobutylene and a small amount up to 7% by weight, based on the isobutylene, of an aliphatic 1,3-diene hydrocarbon of 4–6 carbons, 10–80 weight percent, based on said interpolymer, of a synthetic hydrocarbon wax obtained by the Fischer-Tropsch process, said synthetic wax having an average molecular weight in the range of 630–980 with a melting point in the range of about 180–225° F., 80–150 weight percent, based on said interpolymer, of a solid hydrocarbon resin derived by the metal halide polymerization of a hydrocarbon mixture obtained from the deep cracking of petroleum, 90% of which mixture boils at atmospheric pressure below 125° C., and which mixture comprises at least 10% by weight of conjugated diolefins and a total of at least 20% by weight of conjugated diolefins and readily polymerizable olefins and being approximately devoid of polymerizable aromatics, and 0.4–1.2 weight percent, based on said interpolymer, of 2,6-di-tertiary butyl-4-methyl phenol.

14. A process for preparing a stable solution of butyl rubber which comprises dissolving with agitation in an aliphatic hydrocarbon solvent an interpolymer of isobutylene and a small amount up to 7% by weight, based on said isobutylene, of a conjugated diene hydrocarbon of 4–6 carbons, dissolving in the interpolymer solution thus formed 80–150 weight percent, based on said interpolymer, of a solid hydrocarbon resin derived by the metal halide polymerization of a hydrocarbon mixture obtained from the deep cracking of petroleum and comprising at least 10% by weight of conjugated diolefins and a total of at least 20% by weight of conjugated diolefins and readily polymerizable olefins and being approximately devoid of polymerizable aromatics, and thereafter dissolving in the solution of interpolymer and hydrocarbon resin a wax selected from the group consisting of ozokerite, a synthetic hydrocarbon wax obtained by the Fischer-Tropsch process, said synthetic wax having an average molecular weight in the range of 630–980 with a melting point in the range of about 180–225° F., and mixtures of said waxes, the waxes amounting to 10–80 weight percent of said interpolymer.

15. A process for preparing a stable solution of butyl rubber which comprises dissolving with agitation in an aliphatic hydrocarbon solvent an interpolymer of isobutylene and a small amount up to 7% by weight, based on said isobutylene, of a conjugated diene hydrocarbon of 4–6 carbons, dissolving in the interpolymer solution thus formed 80–150 weight percent, based on said interpolymer, of a solid hydrocarbon resin derived by the metal halide polymerization of a hydrocarbon mixture obtained from the deep cracking of petroleum and comprising at least 10% by weight of conjugated diolefins and a total of at least 20% by weight of conjugated diolefins and readily polymerizable olefins and being approximately devoid of polymerizable aromatics, and thereafter dissolving in the solution of interpolymer and hydrocarbon resin 10–80 weight percent, based on said interpolymer, of the wax ozokerite.

16. A process for preparing a stable solution of butyl rubber which comprises dissolving with agitation in an aliphatic hydrocarbon solvent an interpolymer of isobutylene and a small amount up to 7% by weight, based on said isobutylene, of a conjugated diene hydrocarbon of 4–6 carbons, dissolving in the interpolymer solution thus formed 80–150 weight percent, based on said interpolymer, of a solid hydrocarbon resin derived by the metal halide polymerization of a hydrocarbon mixture obtained from the deep cracking of petroleum and comprising at least 10% by weight of conjugated diolefins and a total of at least 20% by weight of conjugated diolefins and readily polymerizable olefins and being approximately devoid of polymerizable aromatics, and thereafter dissolving in the solution of interpolymer and hydrocarbon resin 10–80 weight percent, based on said interpolymer, of a synthetic hydrocarbon wax obtained by the Fischer-Tropsch process, said synthetic wax having an average molecular weight in the range of 630–980 with a melting point in the range of about 180–225° F.

17. A process for preparing a stable solution of butyl rubber which comprises dissolving with agitation in an aliphatic hydrocarbon solvent having a distillation range in the range of 280–380° F. an interpolymer of isobutylene and a small amount up to 7% by weight, based on said isobutylene, of a conjugated diene hydrocarbon of 4–6 carbons, dissolving in the interpolymer solution thus formed 80–150 weight percent, based on said interpolymer, of a solid hydrocarbon resin derived by the metal halide polymerization of a hydrocarbon mixture obtained from the deep cracking of petroleum, 90% of which mixture boils at atmospheric pressure below 125° C., and which mixture comprises at least 10% by weight of conjugated diolefins and a total of at least 20% by weight of conjugated diolefins and readily polymerizable olefins and being approximately devoid of polymerizable aromatics, and thereafter dissolving in the solution of interpolymer and hydrocarbon resin 10–80 weight percent, based on said interpolymer, of the wax ozokerite.

18. A process for preparing a stable solution of butyl rubber which comprises dissolving with agitation in an aliphatic hydrocarbon solvent having a distillation range in the range of 280–380° F. an interpolymer of isobutylene and a small amount up to 7% by weight, based on said isobutylene, of a conjugated diene hydrocarbon of 4–6 carbons, dissolving in the interpolymer solution thus formed 80–150 weight percent, based on said interpolymer, of a solid hydrocarbon resin derived by the metal halide polymerization of a hydrocarbon mixture obtained from the deep cracking of petroleum, 90% of which mixture boils at atmospheric pressure below 125° C., and which mixture comprises at least 10% by weight of conjugated diolefins and a total of at least 20% by weight of conjugated diolefins and readily polymerizable olefins and being approximately devoid of polymerizable aromatics, and thereafter dissolving in the solution of interpolymer and hydrocarbon resin 10–80 weight percent, based on said interpolymer, of a synthetic hydrocarbon wax obtained by the Fischer-Tropsch process, said synthetic wax having an average molecular weight in the range of 630–980 with a melting point in the range of about 180–225° F.

References Cited in the file of this patent

UNITED STATES PATENTS

| | | |
|---|---|---|
| 2,581,907 | Smith et al. | Jan. 8, 1952 |
| 2,597,378 | Rogers et al. | May 20, 1952 |
| 2,727,874 | Peterson et al. | Dec. 20, 1955 |
| 2,823,194 | McKay et al. | Feb. 11, 1958 |
| 2,918,446 | Serniuk et al. | Dec. 22, 1959 |

FOREIGN PATENTS

| | | |
|---|---|---|
| 569,467 | Great Britain | May 25, 1945 |
| 531,202 | Canada | Oct. 2, 1956 |